United States Patent Office 2,759,871

Patented Aug. 21, 1956

2,759,871

DEFOAMING PROCESS

Jacob S. Cash, Syracuse, N. Y., assignor to Bristol Laboratories Inc., Syracuse, N. Y., a corporation of New York No Drawing. Application August 6, 1952, Serial No. 303,008

15 Claims. (Cl. 195—36)

This invention relates in general to a process and means for producing chemicals by the deep culture, aerated fermentation method, and more particularly to a process and means for abating and reducing foam in the production of chemicals, including antibiotics, by the deep culture fermentation method.

Numerous chemicals, including antibiotics in particular, are produced commercially by growing an organism, e. g. bacteria, fungi, in large tanks containing nutrient materials while passing in a large amount of air. During this time excessive foaming frequently occurs. This reduces markedly the actual production in a given tank because the fermentation tank cannot be utilized to full capacity. The non-toxic defoaming agents presently available are often not sufficiently effective to permit use of the full capacity of the tank even when large quantities of defoamer agent are used, e. g. as much as one or two percent of the weight of the medium in the tank. In addition, the use of large quantities of defoamer agent renders more difficult the isolation of the final product.

It is an object of the present invention to provide an improvement in the process of producing chemicals and antibiotics, e. g. penicillin, streptomycin, by the deep-culture, aerated fermentation method which comprises the step of abating and reducing foam therein by introducing defoamer agent substantially below the surface of the medium as an aerosol in a stream of sterile, non-toxic gas.

It is a further object of the present invention to provide an improvement in the process of producing chemicals by the deep-culture, aerated fermentation method which comprises the step of abating and reducing foam therein by introducing defoamer agent substantially below the surface of the medium in a stream of non-toxic gas as a dispersion of particles having diameters of less than 1000 microns and preferably in which 90% of the particles have diameters of less than 200 microns.

It is a further object of the present invention to provide an improvement in the process of producing antibiotics, e. g. penicillin, streptomycin, by the deep-culture, aerated fermentation method which comprises the step of abating and reducing foam therein by introducing defoamer agent substantially below the surface of the medium in a stream of sterile, non-toxic gas as a dispersion of particles having diameters of less than 1000 microns and preferably in which 90% of the particles have diameters of less than 200 microns.

It is a further object of the present invention to provide an improvement in deep-culture, aerated fermentation processes which makes possible a reduction in the consumption of material, i. e., defoamer agent, and also reduces loss of the product via foaming.

There is now discovered according to the present invention, the improvement in the process of producing chemicals by the deep-culture, aerated fermentation method which comprises the step of abating and reducing foam therein by introducing defoamer agent substantially below the surface of the medium as an aerosol in a stream of non-toxic gas.

A more comprehensive understanding of this invention is obtained by reference to the following examples.

*Example I*

Three duplicate fermentations identified as Runs 1, 2, and 3 were conducted simultaneously in tanks having a nominal capacity of 600 gallons. The techniques and media were those conventional in the prior art. To 325 gallons of sterile lactose-calcium carbonate-corn steep-phenylacetic acid media with added trace minerals was added as inoculum 65 gallons of a Penicillium fermentation. Fermentation was conducted at about 80° F. with the usual aeration and agitation for about 80 hours. At the end of the first twenty-two hours, 60 additional gallons of original, sterile medium were added. Lard oil containing one percent octadecanol was used as the defoaming agent and the only variation between these three runs was in the manner of its addition.

In Runs 1 and 2, the defoamer was dropped onto the surface of the broth in approximately 100 cc. portions by an automatic device (spark plug) as the foam reached a certain height in the tank. This amount of defoamer (100 cc.) had previously been determined to be the minimum satisfactory quantity. Approximately 75% of the consumption of the defoamer occurred in the first twenty hours. Foaming from about the sixth to tenth hour was so great, despite the defoamer agent, that at times it was necessary to reduce aeration and stop agitation. Both of these actions are highly detrimental to the yield of penicillin.

In Run 3, the defoamer was aerosolized into the sparger air, by means of compressed air and a pneumatic atomizing nozzle of the type used for spraying paint, by manual operation as called for by an automatic device (spark plug) indicating that the foam had reached a certain height in the tank. Each addition used about ten to fifteen cc. of defoamer agent. The apparatus in use passed about 340 cc./minute of lard oil at 50 pounds per square inch gage pressure, using about 15 to 20 cubic feet per minute of air. Foaming during the entire fermentation was controlled so well that there was no need at any time to reduce aeration or to stop agitation.

The consumption of defoamer agent in pounds in Run 3 (2.5 pounds) was 4.8 percent of the average consumption in Runs 1 and 2. The peak assay of the broth in Run 3 was 78% of the average peak assay in Runs 1 and 2.

Use of the defoamer agent in aerosol form gave slightly better control of foam and markedly decreased the consumption of defoamer agent. As seen by inspection of Example II, below, the lower titer of Run 3 may be attributed either to the usual variation of 20 percent encountered in biological and biochemical work or to the fact that a minimum weight of lard oil of about one-tenth of one percent of the weight of medium (i. e., four pounds in this case) is generally necessary to provide sufficient esters of long-chain fatty acids as growth stimulants according to Koffler (Ind. and Eng. Chem., 42, 1819–1823 (1950)).

*Example II*

Three duplicate fermentations identified as Runs 4, 5, and 6 were conducted simultaneously in the manner of Example I. The only variation between the runs was in the manner of addition of the defoamer agent; in Runs 4 and 5, as in Runs 1 and 2, the defoamer agent was dropped onto the surface of the broth and in Run 6, as in Run 3, the defoamer agent was added to the sparger air in aerosol form.

The consumption of defoamer agent in pounds in Run 6 (3.9 pounds) was 13.7 percent of the average consumption in Runs 4 and 5. The peak assay of the broth in Run 6 was 98.5 percent of the average peak assay in Runs 4 and 5.

In Runs 4 and 5, but not in Run 6, it was necessary to reduce aeration and stop agitation at times during the sixth to tenth hours because the foaming was out of control.

Use of the defoamer agent in spray form gave slightly better control of foam and markedly decreased the consumption of defoamer agent without decreasing the yield of penicillin.

As defoamer agents, octadecanol in lard oil or corn oil is preferred but use may be made of any of the agents which have been found to be effective and non-toxic in the surface drip method. These include, for example, corn oil (contains approximately 46.3% oleic, 42% linoleic, 7.5% palmitic, 3.5% stearic and traces of arachidonic and lignoceric acid), Defoamer 5 (Swift and Co., contains lard oil, mineral oil, and a surface-active fatty acid derivative), Defoamer 51 (Swift and Co., contains a fat more saturated than lard oil, mineral oil and a surface-active fatty acid derivative), lard oil (Swift and Co., contains approximately 65% oleic, 10% linoleic, 2% linolenic and 23% stearic-palmitic acid), Monosulph (Nopco Chemical Co., sulfonated oil containing oleic and hydroxyoleic acids), Nopalcol 1-0 (Nopco Chemical Co., mono-oleic acid ester of glycol), Nopco glyceryl oleate (mixture of mono- and di-oleic acid esters of glycerol, Nopco GFI (mixture in which fatty acid portion is Nopalcol 1-0), olive oil (Conty Products Co., contains approximately 83% oleic, 7% linoleic, 6% palmitic and 4% stearic acid), Silicone antifoam A (Dew Corning Corp., polydimethyl siloxane), Tween 80 (Atlas Powder Co., serbitan mono-oleate polyoxyalkylene derivative) and Vegifat Y (Nopco Chem. Co., mixture of fatty acids in which oleic acid predominates). Others are Lard Oil plus 6% Alkaterge C, lard oil plus 1% Monsanto defoam AE-1, the oxazolines of Johnson (U. S. Patent No. 2,443,825), and soya bean oil. The octadecanol or other agent used may be dissolved in mineral oil or mineral oil may be used alone.

Typical equipment (spark plug) for automatic addition of defoamer agent to the surface of the broth is shown by Brown and Peterson (Ind. Eng. Chem. 42, 1769 (1950)). In place of the manual operation described for Runs 3 and 6 above, this type of automatic foam detection equipment may be easily connected to the aerosolizing equipment of the present invention to provide injection of limited amounts of the defoamer aerosol upon demand.

It is preferred that the pressure on the supply of defoamer agent be equal to or slightly less than that in the fermentation tank, which is often kept at slightly higher than atmospheric pressure to minimize influx of contaminants. The gas used to vaporize the defoamer must be supplied under pressure. A pressure of 15–30 pounds per square inch gage (p. s. i. g.) is convenient and practical. The gas must be non-toxic to the fermentation; air is preferred.

Many gas-atomizing nozzles (also called pneumatic atomizing nozzles) are available commercially and it is required only that the design and size of orifice produce particles of defoamer agent of diameters of less than 1000 microns; it is preferred that at least 90% of the particles have diameters in the range of 1–200 microns. The size of the orifice and the amount of air passed by it are obviously dependent upon the amount of defoamer agent required and are so selected. The quantity of agent needed is dependent primarily upon the size of the fermentation tank.

The stream of aerosolized defoamer agent is most conveniently added to the fermentation by joining it to the stream of sparger air after the last filter; a separate point of entry may be used, however, provided that suitable protection is provided against back-flooding by the medium at times when the aerosol is not being injected into the broth. The stream of defoamer particles in a non-toxic gas may be added to the fermenting mixture at any point substantially below the surface; it is preferably added near the bottom of theh tank, as in the case when it is mixed with sparger air. In certain, obvious cases it is necessary that the gas be sterile; e. g. in the production of penicillin. The defoamer particles may be solid or liquid or suspensions of solids in liquids.

The use of the defoamer particles of this invention enables a substantial reduction in the consumption of defoamer agent in such deep-culture, aerated fermentations as those used to produce bacitracin, streptomycin, aureomycin, neomycin, terramycin, chloroamphenicol, vitamin $B_{12}$, riboflavin, gluconic acid, itaconic acid and 2,3-butanediol. It is of course essential that the particular defoamer agent selected be effective and non-toxic for the process in which it is used.

The advantage of the use of decreased amounts of defoamer agent include not only saving in expense but also increased ease of isolation of the final product by virtue of the introduction of less contaminating matter.

I claim:

1. In the process of producing chemicals by the deep culture, aerated fermentation method, the step of abating and reducing foam therein which comprises introducing defoamer agent substantially below the surface of the medium as an aerosol in a stream of non-toxic gas.

2. In the process of producing antibiotics by the deep culture, aerated fermentation method, the step of abating and reducing foam therein which comprises introducing defoamer agent substantially below the surface of the medium as an aerosol in a stream of sterile, non-toxic gas.

3. In the process of producing penicillin by the deep culture, aerated fermentation method, the step of abating and reducing foam therein which comprises introducing defoamer agent substantially below the surface of the medium as an aerosol in a stream of sterile, non-toxic gas.

4. In the process of producing streptomycin by the deep culture, aerated fermentation method, the step of abating and reducing foam therein which comprises introducing defoamer agent substantially below the surface of the medium as an aerosol in a stream of sterile, non-toxic gas.

5. In the process of producing chemicals by the deep culture, aerated fermentation method, the step of abating and reducing foam therein which comprises introducing defoamer agent substantially below the surface of the medium in a stream of non-toxic gas as a dispersion of particles having diameters of less than 1000 microns.

6. In the process of producing antibiotics by the deep culture, aerated fermentation method, the step of abating and reducing foam therein which comprises introducing defoamer agent substantially below the surface of the medium in a stream of sterile, non-toxic gas as a dispersion of particles having diameters of less than 1000 microns.

7. In a process of producing penicillin by the deep culture, aerated fermentation method, the step of abating and reducing foam therein which comprises introducing defoamer agent substantially below the surface of the medium in a stream of sterile, non-toxic gas as a dispersion of particles having diameters of less than 1000 microns.

8. In the proceess of producing streptomycin by the deep culture, aerated fermentation method, the step of abating and reducing foam therein which comprises introducing defoamer agent substantially below the surface of the medium in a stream of sterile, non-toxic gas as a dispersion of particles having diameters of less than 1000 microns.

9. In the process of producing chemicals by the deep culture, aerated fermentation method, the step of abating and reducing foam therein which comprises introducing defoamer agent substantially below the surface of the medium in a stream of non-toxic gas as a dispersion of particles, 90% of which have diameters of less than 200 microns.

10. In the process of producing antibiotics by the deep culture, aerated fermentation method, the step of abating and reducing foam therein which comprises introducing defoamer agent substantially below the surface of the medium in a stream of sterile, non-toxic gas as a dispersion of particles, 90% of which have diameters of less than 200 microns.

11. In the process of producing penicillin by the deep culture, aerated fermentation method, the step of abating and reducing foam therein which comprises introducing defoamer agent substantially below the surface of the medium in a stream of sterile, non-toxic gas as a dispersion of particles, 90% of which have diameters of less than 200 microns.

12. In the process of producing streptomycin by the deep culture, aerated fermentation method, the step of abating and reducing foam therein which comprises introducing defoamer agent substantially below the surface of the medium in a stream of sterile, non-toxic gas as a dispersion of particles, 90% of which have diameters of less than 200 microns.

13. In the process of producing chemicals by the deep culture, aerated fermentation method, the step of abating and reducing foam therein which comprises introducing defoamer agent substantially below the surface of the medium as a spray in a non-toxic gas.

14. In the process of producing antibiotics by the deep culture, aerated fermentation method, the step of abating and reducing foam therein which comprises introducing defoamer agent substantially below the surface of the medium as a spray in a non-toxic gas.

15. In the process of producing penicillin by the deep culture, aerated fermentation method, the step of abating and reducing foam therein which comprises introducing defoamer agent substantially below the surface of the medium as a spray in a non-toxic gas.

References Cited in the file of this patent

UNITED STATES PATENTS

| | | |
|---|---|---|
| 1,792,963 | Boye | Feb. 17, 1931 |
| 2,408,527 | Monson | Oct. 1, 1946 |
| 2,443,825 | Johnson | June 22, 1948 |
| 2,523,245 | Coppock | Sept. 19, 1950 |
| 2,550,450 | Brown et al. | Apr. 24, 1951 |